April 17, 1962 — A. V. RAYMOND — 3,029,486
PLASTIC PANEL CLIP
Filed Aug. 14, 1958

INVENTOR:
ALBERT V. RAYMOND,
BY Walter S. Jones
ATTORNEY.

United States Patent Office 3,029,486
Patented Apr. 17, 1962

3,029,486
PLASTIC PANEL CLIP
Albert V. Raymond, Grenoble, France, assignor to
A. Raymond, Grenoble, France, a firm
Filed Aug. 14, 1958, Ser. No. 754,966
Claims priority, application France Oct. 4, 1957
3 Claims. (Cl. 24—73)

This invention relates generally to an improved fastening device and more specifically to an improved fastening device for fastening a panel to a support.

The primary object of the invention is to provide a fastener for attaching the inner trim panel on an automobile body to a support.

A further object of the invention is to provide a fastener wherein the article to be attached to a support is pinched between two elements of the fastener when the fastener is rotated.

Another object of the invention is to provide a plastic fastener for snapping engagement with an apertured support.

Other objects of the invention will, in part, be obvious, and will, in part, appear hereinafter.

Figure 1:
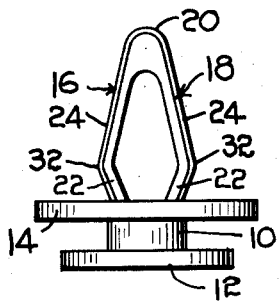
FIG. 1 is a view in elevation of the preferred embodiment of the fastener.
Figure 2:
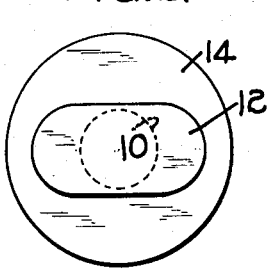
FIG. 2 is a plan view of the fastener shown in FIG. 1.
Figure 3:
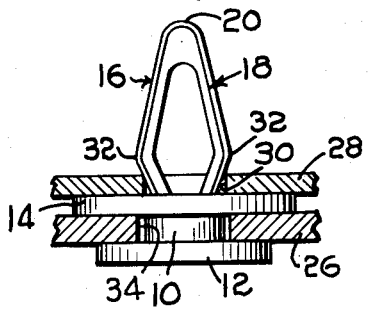
FIG. 3 is a cross section partly in elevation of the fastener shown in FIG. 1 engaged with a trim panel and an automobile body.
Figure 4:
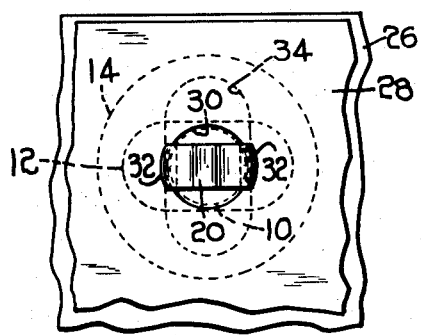
FIG. 4 is a plan view of the fastener installation panel of FIG. 3.

Referring now to the specific disclosure of my invention as illustrated by the drawing, I have shown my fastener attaching a comparatively soft inner trim panel of an automobile to a support.

While my fastener is particularly well suited for this use, it may be used in any place where there is a difference between the flexibility of the flange of the fastener and the contact portion of the article to be attached.

Reference is now to be had to the drawing FIGS. 1 through 4, wherein an illustrative preferred embodiment of a fastener construction made in accordance with the present invention is shown. The fastener comprises a cylindrical base 10 integrally connecting a generally oval shaped head 12 and a generally circular shaped collar 14. The fastener may be made of any appropriate material such as plastic, resilient metal, rubber, etc. However, in the preferred embodiment a plastic material was used. The plane of the collar 14 is at substantially right angles to the axis of the base 10 extending in a substantially longitudinal direction away from the plane of the collar 14. Two tongues 16 and 18 are connected at one end to the collar 14 on the face opposite the one to which the base 10 is connected. The tongues 16 and 18 extend away from the collar 14 in a plane lying generally transverse to the plane of the collar 14 and are connected at their terminal ends to one another to form a bight 20. The tongues 16 and 18 have diverging portions 22 connected to the collar 14 and converging portions 24 which form a pair of knuckles 32 as indicated in FIG. 1. To engage the fastener with a panel 26 and a support 28, the head 12 is passed through an oval aperture 34 in the panel 26 so that the two ovals coincide. After the head 12 has passed through the aperture 34, the fastener is rotated 90° so that the panel 26 is pinched between the head 12 and the collar 14, then the tongues 16 and 18 are passed through an aperture 30 in the support 28 having a diameter slightly smaller than the distance between the outside edges of the knuckles 32.

Figure 5:
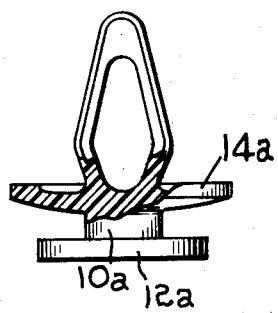
FIG. 5 is a view in elevation, partly in section of a variation of the preferred embodiment of the invention.
Figure 6:
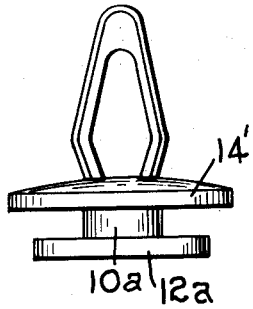
FIG. 6 is a view in elevation of another variation of the preferred embodiment of the invention.

Referring now to a modified form of my invention shown in FIG. 5, there is illustrated a form of the fastener embodying the features of the invention and comprising a cylindrical base 10a integrally connecting a generally oval shaped head 12a and a generally circular shaped collar 14a, all formed similarly to that illustrated in the preferred embodiment. The difference between the preferred embodiment illustrated in FIGS. 1–4 and the modifications illustrated in FIGS. 5 and 6 is as follows: as indicated, the collar 14 in the preferred embodiment lies on a straight line whereas in the variation shown in FIG. 5 the collars 14a is formed into a concavo-convex shape with the concave portion facing the head 12a. In the variation shown in FIG. 6 the collar 14' is formed into a concavo-covex shape with the convex portion facing the head 12a. In all other respects the construction of the two modifications is the same as is shown and set out for the preferred embodiment. This particular type of variation increases the pressure brought to bear on the contact surfaces of the panel not shown.

Figure 7:
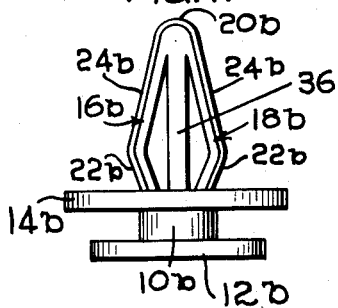
FIG. 7 is a view in elevation of another variation of the preferred embodiment of the invention.

Another modification of the preferred embodiment of my invention is illustrated in FIG. 7. This modification comprises a cylindrical base 10b, integrally connecting a generally oval shaped head 12b and a generally circular shaped collar 14b. The plane of the collar 14b is at substantially right angles to the axis of the base 10b. Extending in a substantially horizontal direction away from the plane of the collar 14b and integrally connected to the collar 14b on the opposite side from the base 10b are two tongues 16b and 18b connected at their terminal ends to form a bight 20b. The tongues 16b and 18b have diverging portions 22b connected to the collar 14b and converging portions 24b as shown in FIG. 7. A brace 36 is provided which is connected at one end to the bight 20 and at its other end to the collar 14b at substantially right angles thereto. The brace 36 gives reinforcement to the tongues 16b and 18b against collapse when very strong axial forces are applied to the fastener.

Figure 8:
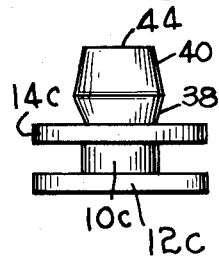
FIG. 8 is a view in elevation of another variation of the preferred embodiment of the invention.
Figure 9:
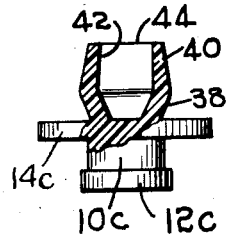
FIG. 9 is a side view, partly in section of the fastener shown in FIG. 8.

Yet another modification of the preferred embodiment of my invention is illustrated in FIGS. 8 and 9. This modification comprises a cylindrical base 10c integrally connecting a generally oval shaped head 12c and a generally circular shaped collar 14c, all formed similarly to that illustrated in the preferred embodiment. Extending in a substantially horizontal diverging direction away from the plane of the collar 14c and integrally connected to the collar 14c on the opposite side from the base 10c is an annular lower wall 38 integrally connected with an annular converging wall 40 which forms an aperture 42 at its terminal end 44.

Since certain other obvious modifications may be made in this device without departing from the scope of the invention, it is intended that all matters contained herein be interpreted in an illustrative and not in a limiting sense.

I claim:

1. A fastener device for securing a trim panel to a supporting panel comprising a molded plastic body having an attaching portion, a laterally extending collar and a head portion, said attaching portion extending from the collar and including resilient diverging and then converging portions joined as a bight and disposed in substantially diamond shape, adapted for snap fastener engagement in cooperation with the collar in an aperture in a support panel, said head portion including an elongated head spaced from the collar by a stud portion adapted for insertion into an aperture in a support, said substantially diamond shape having a bracing element connected at one end to said collar and at the opposite end to the point where said points are united, said bracing element bisecting the apexes of the diamond shape.

2. An integral, one piece, plastic fastening device for connecting a panel member to a support member in spaced relation thereto, one of said members having an oval opening and the other having a circular opening to be placed in alignment with said oval opening, said fastening device comprising a substantially flat head portion having an oval configuration generally corresponding to the configuration of the oval opening in one of said members to permit said head portion to be passed therethrough and rotated to engage against the face of said member having the oval opening, a cylindrical base portion connected at one end centrally to said head portion and extending therefrom in substantially right angled relationship therewith, a substantially circular collar portion having one face centrally united to the other end of said base and in substantially parallel relationship with said head portion and being spaced therefrom for a distance substantially equal to the thickness of one of said members for retention of said member therebetween, said collar portion having a diameter greater than the diameter of the circular opening in the other of said members, and a pair of spaced opposed leg members for passing through one of said openings for retaining the other of said members therewith, each of said leg members having a lower portion united at one end to the other face of said collar portion and extending in a direction opposite to the other leg portion and outwardly from the collar portion and in inclined relationship therewith to a point spaced from the outer point of the other lower portion for a distance greater than the diameter of said circular opening, each leg member having an outer portion connected to the outermost point of the lower portion and inclined inwardly therefrom toward the other outer portion of said leg member.

3. An integral, one piece, plastic fastening device for connecting a panel member to a support member in spaced relation thereto, said panel member having an oval opening and said support member having a circular opening to be placed in alignment with said oval opening, said fastening device comprising a substantially flat head portion having an oval configuration generally corresponding to the configuration of the oval opening in said panel member to permit said head portion to be passed therethrough and rotated to engage against the outside face of said panel member, a cylindrical base portion connected at one end centrally to said head portion and extending therefrom in substantially right angled relationship therewith, a substantially circular collar portion having one face centrally united to the other end of said base portion and in substantially parallel relationship with said head portion and spaced therefrom for a distance substantially equal to the thickness of said panel member for retention of said panel member therebetween, said collar portion having a diameter greater than that of the diameter of the circular opening in said support member, a pair of spaced, opposed leg members for snap actuation through said circular opening in said support member for retaining said panel member in spaced assembled relationship therewith, each leg member having a lower portion united at one end to the face of said collar portion and extending in a direction opposed to the other and outwardly from the collar portion and in inclined relationship therewith and terminating at a point spaced from the terminating point of the other said lower portions for a distance greater than the diameter of said circular opening, each leg member having an outer portion connected to the outermost point of the lower portion and inclined inwardly therefrom toward the outer portion of the other leg member and united therewith as a bight.

References Cited in the file of this patent

UNITED STATES PATENTS

| 488,090 | Rudge | Dec. 13, 1892 |
| 776,957 | Stirckler | Dec. 6, 1904 |
| 1,256,311 | Hartwig | Feb. 12, 1918 |
| 1,701,461 | Graham | Feb. 5, 1929 |
| 1,729,489 | Rile | Sept. 24, 1929 |
| 1,999,990 | Carr | Apr. 30, 1935 |
| 2,058,733 | Smith | Oct. 27, 1936 |
| 2,084,717 | Wiley | June 22, 1937 |
| 2,275,553 | Place | Mar. 10, 1942 |
| 2,455,669 | Gagnier | Dec. 7, 1948 |

FOREIGN PATENTS

| 745,788 | Great Britain | Feb. 29, 1956 |